United States Patent
Kuehnle et al.

(10) Patent No.: US 11,951,995 B2
(45) Date of Patent: Apr. 9, 2024

(54) IDENTIFYING DRIVER AND ROUTE CHARACTERISTICS BASED ON VEHICLE DATA

(71) Applicant: Bendix Commercial Vehicle Systems LLC, Elyria, OH (US)

(72) Inventors: Andreas U. Kuehnle, Villa Park, CA (US); Shaun M. Howard, Irvine, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 68 days.

(21) Appl. No.: 17/224,739

(22) Filed: Apr. 7, 2021

(65) Prior Publication Data
US 2022/0324461 A1    Oct. 13, 2022

(51) Int. Cl.
*B60W 40/09* (2012.01)
*B60W 40/02* (2006.01)
*G01C 21/34* (2006.01)
*G01C 21/36* (2006.01)

(52) U.S. Cl.
CPC ............ *B60W 40/09* (2013.01); *B60W 40/02* (2013.01); *G01C 21/3484* (2013.01); *G01C 21/3617* (2013.01); *B60W 2556/10* (2020.02); *B60W 2556/50* (2020.02)

(58) Field of Classification Search
CPC .. B60W 40/09; B60W 40/02; B60W 2556/10; B60W 2556/50; G01C 21/3484; G01C 21/3617
See application file for complete search history.

(56) References Cited

U.S. PATENT DOCUMENTS

| | | | |
|---|---|---|---|
| 10,810,504 B1* | 10/2020 | Fields | G06N 5/048 |
| 11,354,616 B1* | 6/2022 | Fields | G06Q 10/0639 |
| 11,428,540 B1* | 8/2022 | Gray | G01C 21/3626 |
| 2010/0049397 A1 | 2/2010 | Liu et al. | |
| 2015/0266455 A1 | 9/2015 | Wilson | |
| 2016/0232475 A1* | 8/2016 | Kuehnle | G06Q 10/06398 |
| 2018/0003515 A1* | 1/2018 | Saru | G01C 21/3492 |
| 2018/0164108 A1* | 6/2018 | Rahal-Arabi | G01C 21/3484 |
| 2019/0316922 A1* | 10/2019 | Petersen | A61B 5/165 |

\* cited by examiner

*Primary Examiner* — Mohamed Barakat
(74) *Attorney, Agent, or Firm* — Crowell & Moring LLP

(57) ABSTRACT

The system assigns a plurality of drivers to one or more identified routes. An onboard computing system of a vehicle collects or generates a plurality of vehicle events, which are received at a server via a network. The onboard computing system includes a plurality of sensors and subsystems that are connected to monitor various vehicle components, such as braking, steering, and radar, as well as one or more cameras. A difficulty of each of the identified routes is characterized based on the plurality of vehicle events. A performance of each driver is characterized based on a subset of the plurality of vehicle events collected or received from the vehicle of each driver.

22 Claims, 5 Drawing Sheets

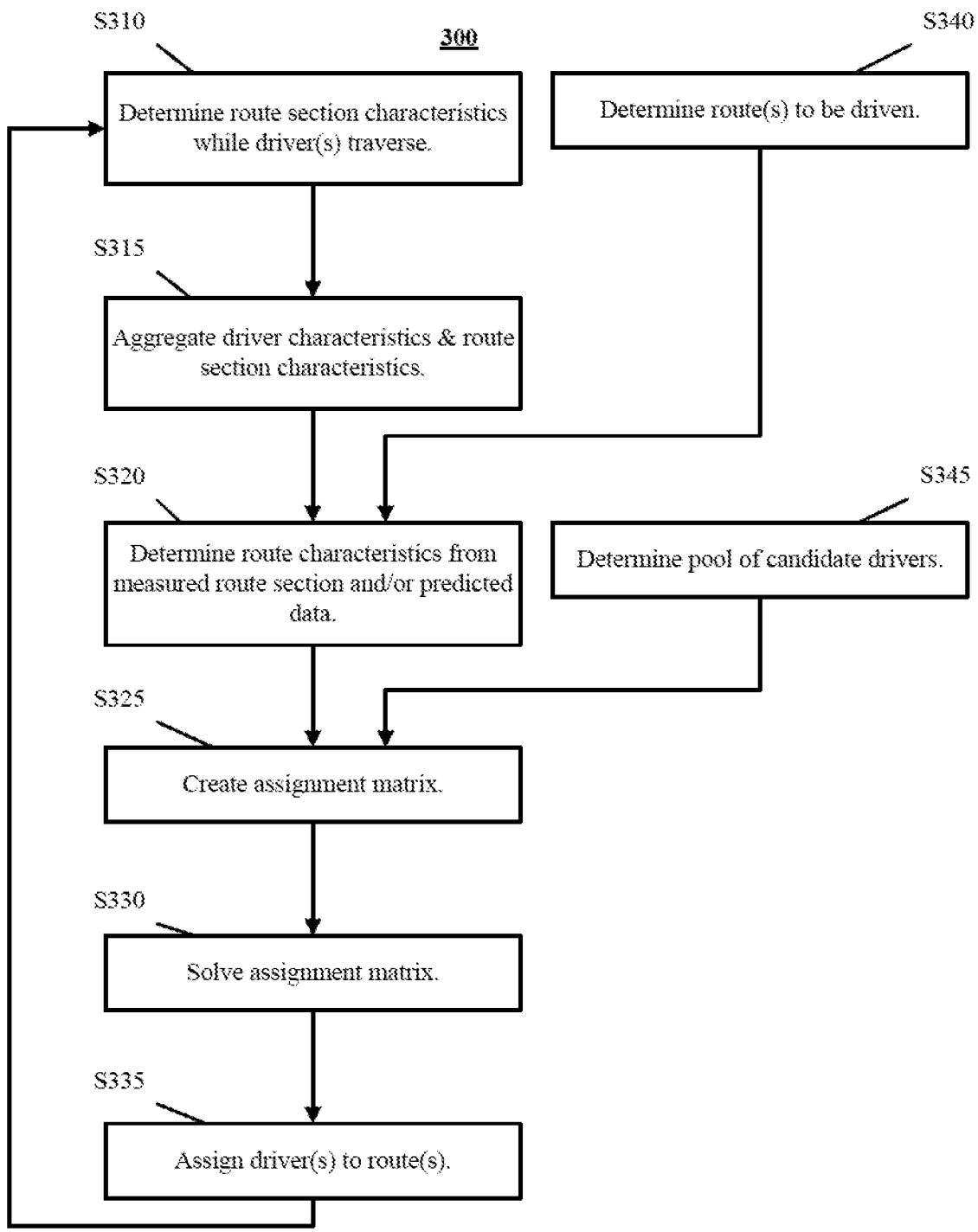

IDENTIFYING DRIVER AND ROUTE CHARACTERISTICS BASED ON VEHICLE DATA

BACKGROUND AND SUMMARY OF THE INVENTION

Commercial vehicle drivers may perform differently under various circumstances, such as weather, time, date, traffic, type of vehicle, and an assigned route. Given a set of circumstances, some drivers may perform in a way that may be safer, more fuel efficient, and/or more resistant to fatigue, while other drivers may perform poorly in comparison. Conventional driver performance-monitoring systems of the prior art may provide only coarse, limited data that reflects a driver's historic performance at only a very high level. Characterizing a driver's performance and comparing with other drivers to assess whether one driver may be better suited to a given route may be a difficult task based on the limited data available.

According to an embodiment of the present subject matter, a method of characterizing the performance of a driver of a vehicle and a plurality of routes includes identifying the plurality of routes, receiving a plurality of vehicle events collected or generated by an onboard computing system of a plurality of vehicles via a network, characterizing a difficulty of each of the plurality of routes based on the plurality of vehicle events, and characterizing a performance of the driver based on a subset of the plurality of vehicle events collected or received from the vehicle of the driver. The characterized difficulty of the route may be based on a mode, mean, or median frequency of the vehicle events generated by the vehicles while traversing the route. The method may further include assigning the driver to a selected route of the plurality of routes based on the characterized performance of the driver. The driver may be assigned to the selected route such that an expected quantity of vehicle events for the selected route may be less for the driver than an expected quantity of vehicle events for the selected route for a second driver, or an expected quantity of vehicle events for all drivers may be less than an expected quantity of vehicle events for all drivers when the second driver may be assigned to the selected route. The plurality of vehicle events collected or generated by the onboard computing system may be based on data at least one of systems, sensors, or components of the vehicle. The plurality of vehicle events may further include a first vehicle event having a first associated weight and a second vehicle event having a second associated weight different from the first associated weight. The characterized difficulty of a route may be based on a plurality of route sections each having a route section characterized difficulty and route section length. The characterized difficulty of one route of the plurality of routes may be based on the plurality of vehicle events received from only vehicles that have traversed the one route at least a predetermined minimum number of times. The plurality of vehicle events may be generated by the onboard computing system of the plurality of vehicles in response to lateral and/or longitudinal controlling of the plurality of vehicles. The method may further include determining a plurality of expected quantities of vehicle events to be collected or generated by the vehicle of the driver when traversing each of the plurality of routes based on at least one of the characterized difficulties of the routes, the characterized performance of the driver, or a length of the route and assigning of the driver to the selected route of the plurality of routes based on the determined plurality of expected quantities of vehicle events. The plurality of vehicle events in which the characterized difficulty of each of the plurality of routes is based may be preferentially selected from a first plurality of vehicle events generated by the vehicle of the driver and secondarily selected from a second plurality of vehicle events generated by the plurality of vehicles not including the vehicle of the driver. The method may further include updating at least one of the characterized route difficulties or the characterized driver performance in real-time based on receiving additional vehicle events. The method may further include rendering a graphical user interface based on the characterized route difficulty and the characterized driver performance that provides a relative indication of driver performance across a plurality of drivers and a relative indication of route difficulty across the plurality of routes.

According to an embodiment of the present subject matter, a system for characterizing the performance of a driver of a vehicle and a plurality of routes includes a processor, a memory in communication with the processor, the memory storing a plurality of instructions executable by the processor to cause the system to identify a plurality of routes, receive a plurality of vehicle events collected or generated by an onboard computing system of a plurality of vehicles via a network, characterize a difficulty of each of the plurality of routes based on the plurality of vehicle events, and characterize a performance of the driver based on a subset of the plurality of vehicle events collected or received from the vehicle of the driver. The characterized difficulty of the route may be based on a mode, mean, or median frequency of the vehicle events generated by the vehicles while traversing the route. The memory further comprises instructions executable by the processor to cause the system to assign the driver to the selected route of the plurality of routes based on the characterized performance of the driver. The driver may be assigned to the selected route such that an expected quantity of vehicle events for the selected route may be less for the driver than an expected quantity of vehicle events for the selected route for a second driver, or an expected quantity of vehicle events for all drivers may be less than an expected quantity of vehicle events for all drivers when the second driver is assigned to the selected route. The plurality of vehicle events collected or generated by the onboard computing system may be based on at least one of systems, sensors, or components of the vehicle. The plurality of vehicle events further includes a first vehicle event having a first associated weight and a second vehicle event having a second associated weight different from the first associated weight. The characterized difficulty of a route may be based a plurality of route sections each having a route section characterized difficulty and route section length. The characterized difficulty of one route of the plurality of routes may be based on the plurality of vehicle events received from only vehicles that have traversed the one route at least a predetermined minimum number of times. The plurality of vehicle events are generated by the onboard computing system of the plurality of vehicles in response to lateral and/or longitudinal controlling of the plurality of vehicles. The memory further comprises instructions to cause the system to determine a plurality of expected quantities of vehicle events to be collected or generated by the vehicle of the driver when traversing each of the plurality of routes based on at least one of the characterized difficulties of the routes, the characterized performance of the driver, or a length of the route and assign the driver to the selected route of the plurality of routes based on the determined plurality of expected quantities of vehicle events. The plurality of vehicle events in which the characterized difficulty of each of the plurality of routes is based may be preferentially selected from a first plurality of vehicle events generated by the vehicle of the driver and secondarily selected from a second plurality of vehicle events generated by the plurality of vehicles not including the vehicle of the driver. The memory further comprises instructions executable by the processor to cause the system to update at least one of the characterized route difficulties or the characterized driver performance in real-time based on receiving additional vehicle events. The memory further comprises instructions executable by the processor to cause the system to render a graphical user interface based on the characterized route difficulty and the characterized driver performance that provides a relative indication of driver performance across a plurality of drivers and a relative indication of route difficulty across the plurality of routes.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 illustrates an overview of a process to assign candidate drivers to transit routes in accordance with an embodiment of the present subject matter.

DETAILED DESCRIPTION OF THE DRAWINGS

Figure 1:
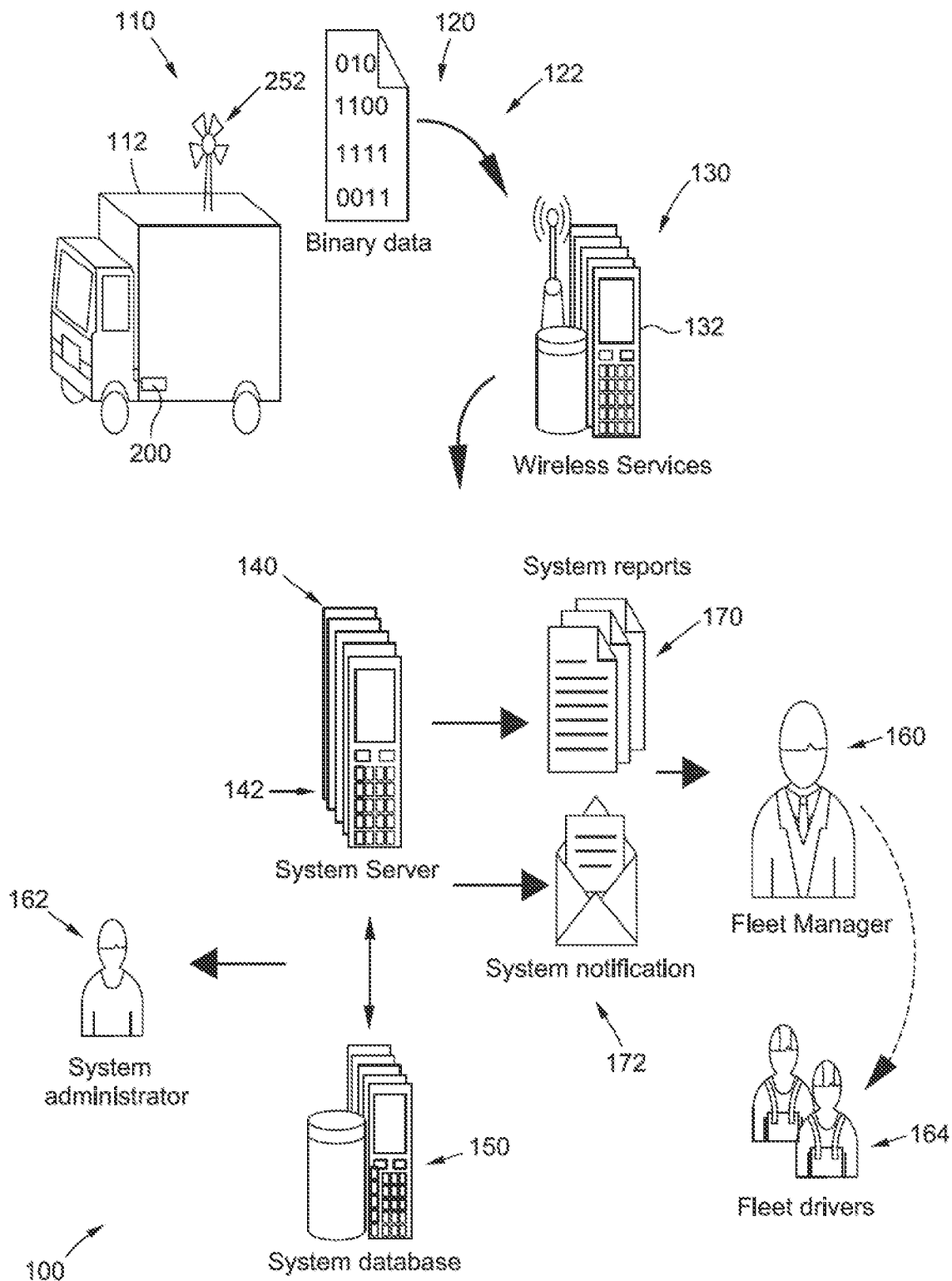
FIG. 1 is a diagram of an overview of a fleet management system in accordance with an embodiment of the present subject matter.

In the following description of the present subject matter, reference is made to the accompanying figures which form a part thereof, and in which is shown, by way of illustration, exemplary embodiments illustrating the principles of the present subject matter and how it may be practiced. Other embodiments can be utilized to practice the present subject matter and structural and functional changes can be made thereto without departing from the scope of the present subject matter.

Driving a vehicle, such as a commercial truck, may be a specialized task utilizing a variety of skills. A driver's ability to perform well under a given set of circumstances may be based on his or her individual abilities, propensities, habits, experience, and the like. For instance, an example driver may be precise in lateral control and lane keeping. This example driver may be well-suited to winding, narrow, and/or mountain roads. Another example driver may excel at anticipating other driver behavior and possess a short reaction time. This example driver may be better suited to driving in dense traffic. Yet another example driver who can quickly match a transmission gear to a vehicle speed may be well-suited to traveling hills and mountains with inclines and declines.

The present subject matter may characterize the performance of drivers and the difficulty of routes based on processing and further interpreting data received from vehicle event detection and reporting systems disposed within each vehicle. The processed and interpreted data may be subsequently used for a variety of purposes, such as to assign candidate drivers to routes, comparing the performance of drivers, and comparing the difficulty and risk associated with various routes. The routes may be used, for example, during transportation of freight and/or passengers in interstate or intrastate commerce via commercial vehicles, such as buses or trucks, for example. A system in accordance with the present subject matter may assign candidate drivers to routes in a way that optimizes, or at least improves the matching of a candidate driver's skill set or behaviors to characteristics and/or conditions of a route. The assignment may be designed to achieve a variety of objectives. In an embodiment, the assignment may be design to minimize, or at least reduce the number of vehicle safety-related events or expected vehicle safety-related events. Other considerations may be possible, depending on the intended goals. For example, the present subject matter may be equally applicable to assigning drivers to routes to utilize the smallest amount of fuel, to achieve the fastest transport of freight, to minimize payroll costs, and/or the like. The routes may be characterized based on past measured performances by other drivers, predicted performance based on similarities with other routes, and/or both. A goal of the system disclosed in accordance with the present subject matter may be to select one or more drivers from a pool of candidate drivers and assign the selected drivers to routes. Further refinements, including the time and date on which the selected drivers should travel the routes may be set forth based on historic and current route conditions.

FIG. 1 illustrates an overview of a vehicle data collection system 100 in accordance with an embodiment. In this example embodiment, a fleet of vehicles 110, such as trucks and cars, and particularly vehicles 112, may be configured with an event detection and reporting system 200 (see FIG. 2A), which may be an in-vehicle computing system that generates actual data relating to driving and vehicle events that may be of interest to a fleet manager 160 or another user. Such a system 200 may include, for example, a Lane Departure Warning (LDW) system 222 (FIG. 2A) that may generate signals indicative of an actual lane departure, such as lane wandering or crossing. Additionally, secondary systems to be described in greater detail below with reference to FIG. 2A may be carried by the vehicles or installed in the vehicle systems, include one or more video cameras, radar, lidar, transmission, engine, tire pressure monitoring and braking systems, for example, may generate additional safety event data and driver behavior data. Front facing cameras, radar and lidar-based system may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112. Event data 120 may include events that occur on a vehicle 110 during deviant or irregular driving behavior, such as when a driver 164 veers from his/her lane, causing a lane departure warning (LDW), changing lanes without a turn signal, following a forward vehicle too closely (forward collision warning; FCW), excessive braking, and the like. In general, vehicle events that generate event data 120 may be caused, directly and/or indirectly, by actions of the driver 164. The event detection and reporting system 200 may collect sensor data from pertinent sensors when vehicle events occur on equipped vehicles 112. If safety systems are not working correctly, the event data 120 transmitted from the affected vehicle 112 may appear unusual when compared with a population distribution of the data from the vehicle fleet 110. Accordingly, statistical vehicle event data, such as the rate of occurrence of one or more the vehicle event(s) for the vehicle fleet 110 may be used as a basis for determining whether a vehicle 112 has one or more issues, especially if a driver incurs different numbers of vehicle events, on average, when operating other vehicles.

One or more servers 140 of the vehicle data collection system 100 may be configured to selectively download, receive, or otherwise retrieve data either directly from the vehicles 112 via the service providers 130 or from collection servers 132 which may be third party servers from one or more various telematics suppliers or cellular providers. Servers 140 may be configured to initiate processing of the event data in manners to be described in greater detail below.

A web application 142 executable on the one or more servers 140 of the vehicle data collection system 100 may include a dynamic graphical user interface for fleet managers 160 and administrators 162 to view all the information once it is processed. The vehicle data collection system 100 of the example embodiment may also include one or more databases 150 configured to selectively store all event information provided from the vehicles 112 in the fleet 110 for one or more designated time intervals, including raw and post-processed trip data.

In accordance with the example embodiment, the system administrators 162 may be users who are provided with interfaces to configure and manage fleets, monitor platform performance, view alerts issued by the platform, and view driver and event data and subsequent processing logs and/or views. Fleet managers 160 may view event information for their respective fleet for internal processing. These events may arrive via user-initiated reports 170/335 in the web application 142 executable on the one or more servers 140, or via email or other notifications 172. Fleet managers 160 may, depending on internal policies and processes or for other reasons, also interface with individual drivers 164 regarding performance goals, corrections, reports, or coaching. The fleet managers 160 may also receive data regarding the routes the fleet vehicles are using.

Figure 2A:
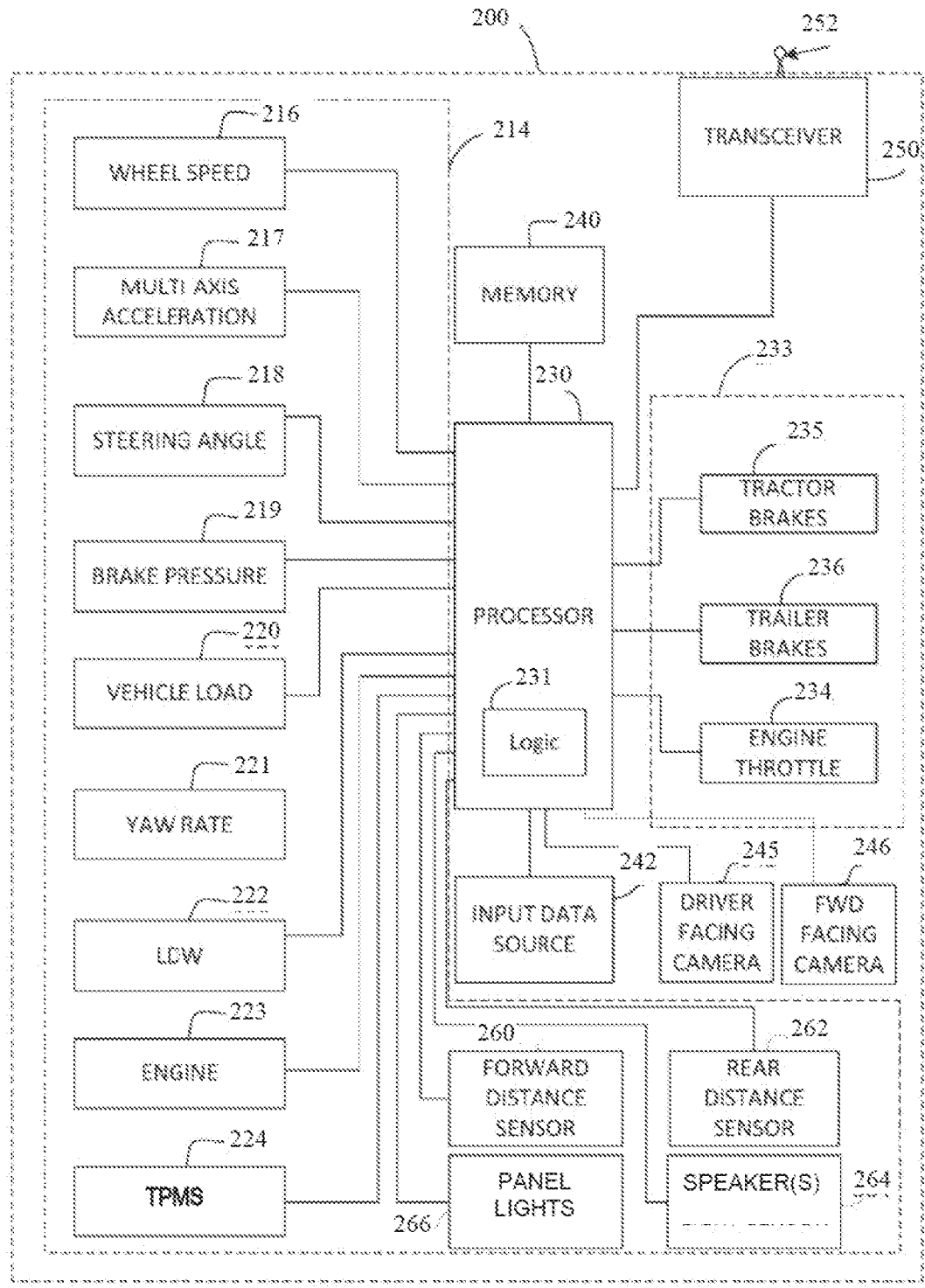
FIGS. 2A and 2B are block diagrams illustrating an embodiment of a vehicle-based computer system in accordance with an embodiment of the present subject matter.

Referring now to FIG. 2A, depicted is a schematic block diagram that illustrates details of an event detection and reporting system mentioned above, and which is configured to be used in accordance with an embodiment of the present subject matter. As further detailed below, the in-vehicle event detection and reporting system 200 may be adapted to detect a variety of operational parameters and conditions of the vehicle 112 and the driver's interaction therewith and, based thereon, to determine if a driving or vehicle event has occurred (e.g., if one or more operational parameter/condition thresholds has been exceeded). Data related to detected events (i.e., event data), such as safety events, as well as the routes, lanes, and locations, timestamps, other vehicle sensor data, such as tire pressure from the TPMS system, speed, and any other data provided by the systems and sensors in FIG. 2A may then be stored and/or transmitted to a remote location/server, as described in more detail below. In an embodiment, the data may be transmitted to a remote server as early as possible, including whenever connectivity to a data network, such as a cellular data network or Wi-Fi data network, is available. Frequently transmitting the vehicle event data to the remote server may allow for a real-time or near real-time monitoring of driver performance and route difficulties. For instance, a driver that begins causing generation of vehicle events frequently within a recent time period may be suspected as being tired, suffering from illness, or even intoxicated. Similarly, if one or more drivers traversing a route or route section suddenly begins exhibiting more vehicle events than a normal or baseline amount, it may be indicative of a hazard on the route, such as construction, debris, a collision, a reduced number of lanes, and the like. Upon making this determination, further vehicle event, sensor, and/or system data may be retrieved, compared, and/or cross examined to confirm a more precise cause. For example, an excessively slow travel speed through a route section may cause the system to analyze the temperature and weather data conditions either from the vehicle 112 and/or other local weather data servers to assess whether the road may be icy or covered with snow. Similarly, images or video captured using any of the cameras 245/246 while a vehicle 112 is traversing through a route or route section determined to possibly contain a hazard, which may be transmitted to a remote server and subsequently to the fleet manager 160 and/or dispatching software, which may be programmed to dynamically assign or re-assign drivers to an alternate route or route section to avoid the identified hazard.

The event detection and reporting system 200 of FIG. 2A may include one or more devices or systems 214 for providing input data indicative of one or more operating parameters or one or more conditions of a commercial vehicle 112. It should be appreciated that vehicle devices, systems, and subsystems 214 may include additional as well as fewer devices, systems, and subsystems than those shown in FIG. 2A. Alternatively, the event detection and reporting system 200 may include a signal interface for receiving signals from the one or more devices or systems 214, which may be configured separately from the system 200. For example, the devices 214 may be one or more sensors, such as but not limited to, one or more wheel speed sensors 216, one or more lateral/longitudinal acceleration sensors/accelerometers, such as multi-axis acceleration sensors 217, a steering angle sensor 218, a brake pressure sensor 219, one or more vehicle load sensors 220, a yaw rate sensor 221, a lane departure warning (LDW) sensor or system 222, one or more engine speed or condition sensors 223, and a tire pressure (TPMS) monitoring system 224. The event detection and reporting system 200 may also utilize additional devices or sensors in the exemplary embodiment including for example a forward distance sensor 260 and a rear distance sensor 262 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 200 may also include instrument panel lights 266 and speaker(s) 264, which may be usable to provide headway time/safe following distance warnings, lane departure warnings, and warnings relating to braking and or obstacle avoidance events.

The event detection and reporting system 200 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to one or more stored threshold values or desired averages, or to process the input data and compare the raw or processed input data to one or more circumstancedependent desired value. The processor's 230 role may be to process input and outputs regarding safety, warning, or indication systems of the vehicle 112 and may be distinct from other onboard vehicle 112 processors that perform tasks such as controlling the ignition timing, obtaining measurements from a mass airflow sensor (MAF), pulsing fuel injectors, and the like. Processor 230 may communicate with other vehicle 112 processors via a vehicle data bus, such as a Controller Area Network (CAN bus), for example.

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle 112 to initiate corrective action. For example, the processor 230 may generate and send the control signal to an engine electronic control unit or an actuating device to reduce the engine throttle 234 and slow the vehicle 112 down. Further, the processor 230 may send the control signal to one or more vehicle brake systems 235, 236 to selectively engage the brakes (e.g., a differential braking operation). A variety of corrective actions may be possible and multiple corrective actions may be initiated at the same time.

The event detection and reporting system 200 may also include a memory portion 240 for storing and accessing system information, such as for example, the system control logic 231. The memory portion 240, however, may be separate from the processor 230. The sensors 214 and processor 230 may be part of a pre-existing system or use components of a pre-existing system.

The event detection and reporting system 200 may also include a source of input data 242 indicative of a configuration/condition of a commercial vehicle 112. The processor 230 may sense or estimate the configuration/condition of the vehicle 112 based on the input data, and may select a control tuning mode or sensitivity based on the vehicle configuration/condition. The processor 230 may compare the operational data received from the sensors or systems 214 to the information provided by the tuning.

In addition, the event detection and reporting system 200 may be operatively coupled with one or more driver-facing imaging devices, shown in the example embodiment for simplicity and ease of illustration as a single driver facing camera 245 that may be trained on the driver and/or trained on the interior of the cab of the commercial vehicle 112. However, it should be appreciated that one or more physical video cameras may be disposed on the vehicle 112 such as, for example, a video camera on each corner of the vehicle 112, one or more cameras mounted remotely and in operative communication with the event detection and reporting system 200 such as a forward-facing camera 246 to record images of the roadway ahead of the vehicle 112. In the example embodiments, driver data may be collected directly using the driver facing camera 245 in accordance with a detected driver head position, hand position, or the like, within the vehicle being operated by the driver. In addition, driver identity may be determined based on facial recognition technology and/or body/posture template matching.

The event detection and reporting system 200 may also include a transmitter/receiver (transceiver) module 250 such as, for example, a radio frequency (RF) transmitter including one or more antennas 252 for wireless communication of the automated control requests, GPS data, one or more various vehicle configuration and/or condition data, or the like between the vehicles 112 and one or more destinations such as, for example, to one or more services (not shown) having a corresponding receiver and antenna. In an example, transceiver may communicate cellularly using its antenna 252 over a cellular telephone network with a cloud-based computing system. The cloud computing system may be implemented, for example, by one or more servers 140, and/or servers 132. The transmitter/receiver (transceiver) module 250 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 may be operative to combine selected ones of the collected signals from the sensor systems described above into processed data representative of higher-level vehicle condition data such as, for example, data from the multi-axis acceleration sensors 217 may be combined with the data from the steering angle sensor 218 or forward-facing camera 246 to determine excessive curve speed event data. Other hybrid event data relatable to the vehicle 112 and driver of the vehicle 112 and obtainable from combining one or more selected raw data items from the sensors includes, for example and without limitation, excessive braking event data, excessive curve speed event data, lane departure warning event data, excessive lane departure event data, lane change without turn signal event data, loss of video tracking (LOVT) event data, LDW system disabled event data, distance alert event data, forward collision warning event data, haptic warning event data, collision mitigation braking event data, ATC event data, ESP event data, RSP event data, ABS event data, TPMS event data, engine system event data, average following distance event data, average fuel consumption event data, average ACC usage event data, and late speed adaptation (such as that given by signage or exiting).

The event detection and reporting system 200 of FIG. 2A may be suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random-access memory (RAM) or other dynamic storage device for storing instructions and loaded portions of the trained neural network to be executed by the processor 230, and read only memory (ROM) or other static storage device for storing other static information and instructions for the processor 230. Other storage devices, such as flash, may also suitably be provided for storing information and instructions as necessary or desired.

Instructions may be read into the main memory 240 from another computer-readable medium, such as another storage device of via the transceiver 250. Execution of the sequences of instructions contained in main memory 240 may cause the processor 230 to perform the process steps described herein. In an alternative implementation, hard-wired circuitry may be used in place of or in combination with software instructions to implement the present subject matter. Thus, implementations of the example embodiments are not limited to any specific combination of hardware circuitry and software.

Figure 2B:
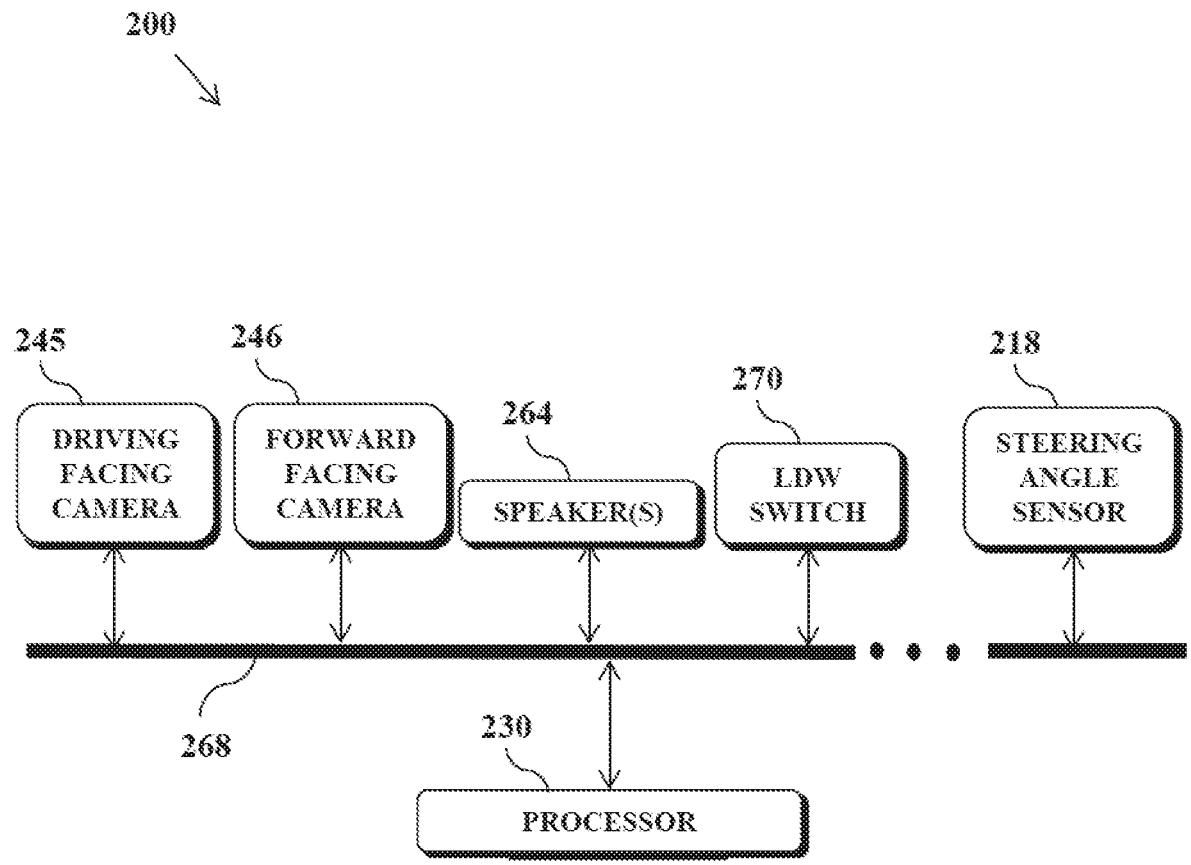

Referring now to FIG. 2B, only certain components of the event detection and reporting system 200 of FIG. 2A are depicted. As shown, various components of the system 200 are shown as being in communication with processor 230 by being connected to a vehicle bus 268, which can be a private bus dedicated to the system 200 or a general vehicle bus, CAN bus, and the like. As shown, in addition to DFC 245, FFC 246, speaker(s) 246 and steering angle sensor 218, an LDW switch 270 may also be shown as being in communication with processor 230 via bus 268. LDW switch 270 may be a component provided in the interior of a vehicle by which the driver can legitimately switch off the LDW system 222 on a temporary basis. This functionality may be provided so that drivers 164 can temporarily avoid receiving repeated unwarranted warnings due to certain unusual road conditions, such as passing through a construction area where lanes are significantly narrowed, rendering it impossible or very difficult to otherwise avoid setting off the LDW system 222.

Referring to the components of FIG. 2B by way of example only, processor 230 may read and/or generate DTCs based on the malfunction of the attached systems and sensors connected via the vehicle bus(es) shown in FIGS. 2A and 2B, for example. Processor 230 may also generate DTCs based on detected faults of its own, such as when it fails to read/write to/from a memory such as memory 240, an external memory card, or a memory-mapped I/O device, such as a display. In one example, the processor 230 may read DTCs, decode the DTCs, and transmit them using the transceiver 250 via a cellular connection to servers 132, servers 140, or a cloud-based system.

FIG. 3 shows an overview of a process 300 to assign one or more drivers 164 to one or more routes. Process 300 may be executed on one or more computing systems, such as servers 132, servers 140, a cloud-based system, and the like, which include processors capable of executing instructions stored in a non-transitory computer readable medium. As used herein, whenever an act is described to be performed by "the system," it may refer to one or more of servers 132, servers 140, or the cloud-based system previously discussed. Process 300 may be iterative, parallel, and/or ongoing, as drivers 164 become available and unavailable, pickup and drop-off points are changed, and routes are improved, closed, and/or reopened. As each driver 164 operates a vehicle 112 of the fleet 110 on a route, the event detection and reporting system 200 may be used to characterize the driver's behavior and to characterize the route in S310 based on vehicle event data generated within the event detection and reporting system 200 by systems, subsystems, sensors, and other vehicle components. For instance, and as previously described, the event detection and reporting system 200 may capture braking event data from one or more of a variety of sensors, such as the multi-axis acceleration sensor 217, the brake pressure sensor 219, as well as via communication with the tractor brakes 235 and trailer brakes 236. Braking data of this type, collision mitigation braking event data, and the like, may be stored in the form of records in system database 150, servers 132, servers 140, or a cloud computing and storage system.

The braking data may be captured for a driver 164 during a specific section of a route and compared with the braking data of other drivers 164 on the same section of a route. In an example, a Driver A may be determined to incur 0.02 collision-mitigation braking events per mile while traveling northbound on I-5 between exits 100 and 101. Each time Driver A travels on this same route section, the system may update both the braking event data for the route and the driver, which reflects on Driver A's frequency of braking events per mile. Driver A's 0.02 collision-mitigation braking events per mile may be compared with the collision-mitigation braking events of other drivers 164 on that same route section to assess whether Driver A may be performing better or worse than the other drivers 164, and whether there are other factors that may be related, such as any of time, date, traffic, wildlife, weather, speed, route familiarity, and the like. Braking event data may also be indicative of the difficulty of a route section, where it may be assumed that a driver 164 will brake more frequently when the route section may be more difficult.

Routes may be divided into a plurality of linked sections of road. As used herein, the term "route" should be understood to comprise one or more "route sections," since a "route section" may be merely a subdivision of a "route." A given route may be subdivided into as many route sections as practical to effectively capture the characteristics of the route. For instance, a route having a length of two miles may be subdivided into a first route section having a length of one mile and a second route section having a length of one mile. Subdividing the route in this way may be logical where the first mile of the route may be of a different character than the second mile. For instance, the first mile of the route may be straight and flat while the second mile may be narrow with many sharp turns and steep hills. In general, drivers may be assigned to routes, rather than route sections. Therefore, in accordance with the present subject matter, route section characteristics based on aggregated vehicle event data may be further summed according to distance-weighted route sections to characterize the overall route, as will be subsequently described. A route may be logically divided with each section having varying lengths; e.g., into 9.6 miles of Route 241, between exits A and B, followed by 2.4 miles of Jamboree, between exit B and the pickup point. A route may be divided each mile and/or by each road that is involved, taking sections of each.

In addition to geographic data that characterizes the location of each section, such as the name of the road, mile markers, exit signs, nearby landmarks, and the like, each route section may be associated with one or more, possibly default or average, values of various vehicle event frequencies. Geographic data may be obtained, for example, via the GPS transceiver 250 disposed within the event detection and reporting system 200, based on Wi-Fi positioning technology, or even by identifying road signs and landmarks using the forward-facing camera 246 of the vehicle 112. Alternatively, or in addition, vehicle event frequencies for a given route section may be determined experimentally by actual vehicles 112 that traverse the route. For example, a given route section may be associated with previously-obtained vehicle event data from fleet drivers 164 while traveling through the route sections. This vehicle event data may be aggregated in the form of statistics that reflect the frequencies with which an individual driver causes the generation of vehicle events to occur and the average frequency of vehicle events for all drivers 164 that have traversed a given route section. The aggregation of this data may be performed as part of S315. This vehicle event data may be based on data provided by the event detection and reporting system 200 of each vehicle 112 during travel of the route section. The vehicle event data may be compiled and include, for example, the average and/or mean number of braking events, number of collision-mitigation braking events, average speed, number of acceleration and deceleration events, number of lane departures, number of times the route section was traversed by fleet drivers 164, and the like.

If no prior vehicle event data exists for the route section (s), default vehicle event frequencies may be used to "fill in the blanks." The default vehicle event frequencies may be determined by extrapolating from actual historic vehicle event data for other, similar routes. The route may be characterized by a distance-weighted sum of route section vehicle event frequencies, which may be specific to the candidate driver pool of consideration, and/or derived from other drivers 164 that previously traversed the route(s). The system may determine, as a result, an expected frequency of vehicle events for each section of a route. Further calculations may be performed, based on the vehicle event frequency for each section, to determine an expected number of vehicle events for an entire route. To summarize, there may be a preferential or quality hierarchy of vehicle event data for route sections. The best quality, or most preferential data may be each individual driver's vehicle event frequency on a given route, next best quality may be other drivers' average event frequency on the given route, and least quality may be the average event frequency for a different, but similar type of route; e.g., on highways it may be expected that 0.0012 excessive braking events occur per mile.

The age of the measured vehicle event frequency data may also be considered, with newer data preferred; e.g., weighting newer data from other drivers more heavily than older data from an individual driver on the same route section. This preference for new data may favor current route conditions versus older route conditions, which may be more useful and relevant. If vehicles are missing sensors, e.g. a radar system, the average of other vehicles having this missing sensor and traversing this route may be used as a substitute for the driver's performance there. If a driver has used vehicles with this missing sensor on other routes, then the driver's average with these other vehicles (having the sensor) may be used for those vehicles not having the sensor. In this fashion, vehicles with different sensor constellations may be accommodated. The event rate of other, similarly performing, drivers traversing the section with the sensor may be used as a proxy for the event rate of a driver traversing a section without the sensor (i.e. if Driver A and Driver B have generally similar event rates, by type, and driver A traverses a section using a vehicle without, say, a radar, but driver B has traversed this same section with a radar-equipped vehicle, then driver B's radar related event rates may be used for those of driver A on this section, i.e. a 'stand-in' event rate).

An assignment matrix may be created in S325. The assignment matrix may reflect the available pool of candidate drivers determined in S345 and the routes that may need to be completed, as identified in S340. The entries in the assignment matrix may be the expected number of vehicle events for a given driver on a given route. The entries may be determined by dividing the length of the given route by a geometric or harmonic mean of the driver and route characteristics. These entries may combine the route characteristics, driver characteristics, and route lengths into a single value. The single value may estimate how well the driver may be expected to perform on the route in terms of a total number of estimated vehicle events on the given route. The goal may be to assign the candidate drivers to the routes while minimizing or at least reducing the total number of vehicle events and/or expected vehicle events.

Driver and Road Quality Measures

There may be two types of metrics to assess driver performance and route quality. The quality of a given route section may be characterized by the average lane width, the sinuousness, the presence or absence of lane markings, the quality of the lane markings, and the like, which may make lane keeping more difficult. These attributes may be obtained using the forward-facing camera 246 of the vehicle 112, for example. These characteristics may be absolute, direct, geometric measures that characterize the given route section. Alternatively, or in addition, a given route section may be indirectly characterized based on how drivers 164 typically perform in that route section. If drivers 164 tend to exhibit a greater number of lane departures, for example, while traversing the given route section, it may be taken as a proxy indication that the route section may be difficult. Stated another way, an average or median number of lane departures per mile on a given route section may be an indirect measure of route difficulty.

On the other hand, a driver's number of lane departures may also be used to directly characterize the driver's performance, at least in a lateral sense. An absolute measure of lane keeping performance may be known as standard deviation of lane position (SDLP) and may be about 30 centimeters, for example. A large SDLP for an individual driver may indicate that the driver may be a worse performer in lane keeping versus a driver having a smaller SDLP. SDLP may be measured in an ongoing, real-time manner on the vehicle 112 via the event detection and reporting system 200. The SDLP may be associated with the driver, as previously discussed, as well as a route and/or location. Narrow route sections may create difficulties for drivers 164 with a larger SDLP. Therefore, the difficulty of lane keeping a route section may be characterized by its lane width as a direct measure of route difficulty.

The SDLP for a route or alternatively, the number of lane departures may be determined. That is, an individual driver's lane departure frequency, which may be measured as lane departures per mile, may be a proxy indication for their SDLP and may be used instead as an indirect proxy measure. Either or both of the direct and indirect measurements may be utilized and mixed and matched as desired. A characteristic curve or function or lookup table relating the two may be created and aid in mapping and/or converting from the indirect to direct values and vice versa.

In sum, the properties of a route may be determined by a sensor or camera, as a direct measure, or how well drivers 164 typically perform on the same route as an indirect measure. A driver's performance may be directly measured by how well he or she stays within a lane using SDLP or indirectly by the frequency of lane departures when compared with other drivers 164 on the same route. It may be seen that the lane departure frequency, when collected over a group of drivers 164, characterizes both the route and the individual drivers 164. For instance, Driver A traversing a certain route section may have X number of vehicle events of some type, which value is used to update the route section statistics as well as the driver's average performance there. The route section average updating may consider that some drivers have traversed a section more often than others and discount their contributions to the route section average; e.g., by only allowing a similar number of each driver's traverses of a section to contribute that sections average.

In another example, each driver may only contribute a limited, predetermined number of times, such as three times, to the route section average. The driver's average performance may also be considered in the calculation; e.g., if a "bad" or particularly "good" Driver Z has often driven a route section, the system may limit Driver Z's contribution to the route section average. Stated another way, a driver's performance on a given route or route section may be discounted after a predetermined number of traversals, if a driver is a poor performer when compared to an average driver, and/or if a driver is an outstanding performer when compared to an average driver. The same technique may be applied to distance keeping, which refers to how well a driver may be able to maintain longitudinal control. The difficulty of a given route in terms of distance keeping may be directly determined based on the number of sections where two lanes merge into one and/or cut-ins or indirectly based on how often excessive braking or collision-mitigation braking events occur on the given route. A proxy for the driver's distance keeping performance may similarly be indirectly determined based on the number of excessive or collision-mitigation braking events when compared with an average or mean determined of other drivers 164 who have traversed the same route. Similar discounting schemes for "good," "bad," or frequently-traversing driver event data contributions may be applied, as described above. As also previously discussed, the indirect proxy measures may capture both the route difficulty and the driver performance based on a comparison with the mean or average with other drivers 164 on the same route.

Relating Driver and Road Quality Measures

The drivers' performance characteristics may be related to the route characteristics using the indirect measures, for example. A difficult route may be one with many vehicle events, such as lane departures, which may cause a lane departure warning (LDW) event to be generated by the LDW system 222, for example. A given route may be characterized according to any number of vehicle events that may occur during travel of the route. For instance, a given route or route section may have one, five, ten, twenty, fifty, or even hundreds of different vehicle events and associated event frequencies attributed to it. For the purpose of simplifying the subsequent discussion, only a single vehicle event will be considered in the context of assessing the difficulty of a route or route section. The present subject matter should not be construed to be limited to a single vehicle event type to characterize a route. Returning to the example, a poorly performing driver may be one that frequently causes the generation of LDW events with fewer miles between each LDW event than the average or mean of other drivers 164. A driver that traverses a route may be characterized, in the example of LDW-type events, by the following geometric mean:

$$\sqrt{\text{average distance between events (all drivers)} \times \text{average distance between events for individual driver}}$$

The first term may be expressed as the average (or mean) number of miles on a given route for all drivers 164 per, or between, each LDW event. The second term may be expressed as the average (or mean) number of miles for an individual driver of interest per, or between, each LDW event. Where the first and second terms are both small, the resulting product may also be low, which may indicate a low-performing driver and a difficult route. Lane keeping in this scenario may be unacceptably poor. A low value of the first term may indicate that a typical driver exhibits frequent LDW events incurred by deviating from the correct lane position on the given route, thus, the route may be characterized as difficult. A low value of the second term may indicate that the individual driver of interest may perform poorly with respect to lane keeping in general, on any route.

For dimensional analysis reasons, the square root of the product of the two terms, known as the geometric mean, may be used to characterize the driver on the route. The resulting product may have the units of distance/LDW event, or in other words, the expected distance per LDW event for the individual driver if he or she is assigned to the given route.

An intermediate product value, which may be higher than the previously described low product may be reached when the first term may be high and the second term may be low, or vice versa. In this case, the first term may indicate that the typical driver may traverse longer distances between each LDW event. This may indicate that the given route may be less difficult. As in the prior example, a low second term may mean that the individual driver of interest performs poorly with respect to lane keeping. The resulting product may support the conclusion that the given easier route may be forgiving of the individual driver's lower lane keeping skill. Alternatively, an intermediate resulting product may mean the opposite, such that a road may be more difficult for a typical driver, but that the driver has greater lane keeping skill and may be able to manage it with greater distances between each LDW event.

The highest value of the resulting product may be reached when a driver skilled at lane keeping may be paired with an easier route. Assigning a skilled driver to an easy route may be an inefficient. For instance, it may be desirable to assign the drivers 164 having greater skill to the more difficult routes and while assigning less-skilled drivers 164 to the easier routes. For this reason, the system may be designed to determine, based on a minimum and/or maximum threshold resultant product value, whether the assignment of an individual driver to a route may be satisfactory.

Driver and route characteristics may also be combined using the harmonic mean, which may be calculated for each type of vehicle event as:

$$\frac{2}{1/\text{average distance between events for route} + 1/\text{average distance between events for individual driver}}$$

The harmonic mean may average rates and may produce value with units of distance, e.g., miles, between vehicle events. The following example may aid in understanding the geometric and harmonic mean calculation. Either method may be used to estimate how a given driver will perform on a given route. Suppose a given Route A exists where the average distance between a vehicle event X may be five miles for all drivers 164. Driver B causes generation of vehicle event X at an average of every four miles. The geometric mean may be expressed as:

$$\sqrt{5 \text{milesper} X \text{event} \times 4 \text{milesper} X \text{event}} = 4.47 \text{ miles per } X \text{ event}$$

The harmonic mean may be expressed as:

$$\frac{2}{1/5 \text{ miles per } X \text{ event} + 1/4 \text{ miles per } X \text{ event}} = 4.44 \text{ miles per } X \text{ event}$$

Calculation of Updated Event Rate for Route for Driver

In another example, Driver C is recorded to cause generation of vehicle event Y at a rate of every six miles. This event data may be recorded from four traversals of a route section D. Upon driving the same route section D a for a fifth time, Driver C improves his or her performance by causing generation of Y vehicle event at a rate of every eight miles. Driver C's recursive average may be expressed as:

$$\frac{4}{5} \times 6 + \frac{1}{5} \times 8 = 6.4 \text{ miles per } Y \text{ event}$$

In this example, Driver C achieved a rate of one Y event for every six miles for four out of the five traversals and a rate of one Y event for every 8 miles for just one of the traversals. Note that an exponentially weighted moving average may also be used instead of the example recursive average, which may better reflect the driver's recent performance more strongly while discounting the driver's older performance.

The route event frequency characteristic may be updated in an analogous fashion. It may be desirable to have multiple, different drivers 164 traverse a route, since this may elicit vehicle event data that better reflects typical route characteristics rather than vehicle event data produced by a single driver who traverses a route a plurality of times. This desired multiplicity of drivers 164 may be achieved by considering only each driver's average number of vehicle events on a route, regardless of the number of traversals of the route, and computing an average of each respective driver's average. For example, Drivers E, F, and G have traversed a route section 100, 25, and 4 times, respectively. Driver E's traversals would normally dominate the route section average calculation if all 100 vehicle event data values were used in addition to the 25, and 4 vehicle event data values. Instead, the average of each driver's values may be used according to the following expression:

$$\text{route section event frequency} = \frac{\text{Driver } E\text{'s average} + \text{Driver } F\text{'s average} + \text{Driver } G\text{'s average}}{\text{\# of drivers}}$$

When no traversals of a given route exist, a default number of vehicle events may be used initially and subsequently updated as drivers 164 begin traversing the route and causing the generation of actual vehicle event data. The update may be performed using the recursive mean calculation above or with an exponentially weighted moving average.

The following example may show how a route's propensity to cause drivers 164 to generate vehicle events may be determined from its constituent route sections, as performed in S320. An example given Route K may include two route sections. The first route section may comprise 75% of the total length of Route K while the second route section may comprise the remaining 25%. The first route section may cause drivers 164 to generate a vehicle event L at an average of every 8 miles. The second route section may cause drivers 164 to generate the vehicle event L an average of every 2 miles. The route characteristics may be determined by distance-weighting the route section characteristics according to the expression:

(section 1 weight) × distance per $L$ event
+(section 2 weight) × distance per $L$ event = distance per $L$ event $(0.75) \times 8$ miles per $L$ event + $(0.25) \times 2$ miles per $L$ event = 
6.5 miles per $L$ event Thus, Route K may typically be expected to cause an average driver to generate a single L event for every 6.5 miles traveled.

The following example may illustrate how an assignment matrix may be generated, as in S325, to assign drivers 164 to routes. A given Driver M may cause an R event to be generated every 4 miles on average. A Driver N may cause an R event to be generated every 6 miles on average. Two routes may require assignment to drivers 164. A first Route P may be 100 miles in length and of a difficulty that causes a typical driver to generate an R event at 7-mile intervals, while a second Route Q may be 200 miles in length and of a difficulty that cause a typical driver to generate an R event at 5-mile intervals. Using the geometric mean previously described, it may be expected that for the Route P and Driver M:

$$\sqrt{7\text{milesperRevent} \times 4\text{milesperRevent}} = 5.29 \text{ miles per } R \text{ event}$$

Dividing the total distance of Route P (100 miles) by this event frequency results in 18.9 expected R events for Driver M if assigned to traverse Route P.

The same calculations may be applied to the other combinations: Driver M, Route Q:

$$200 \div \sqrt{5\text{milesperRevent} \times 4\text{milesperRevent}} = 44.7 \text{ expected } R \text{ events.}$$

Driver N, Route P:

$$100 \div \sqrt{7\text{milesperRevent} \times 6\text{milesperRevent}} = 15.4 \text{ expected } R \text{ events.}$$

Driver N, Route Q:

$$200 \div \sqrt{5\text{milesperRevent} \times 6\text{milesperRevent}} = 36.6 \text{ expected } R \text{ events.}$$

These results may be assembled into an expected R events assignment matrix, which may be used for assigning Driver M and Driver N to Route P and Route Q in a manner that minimizes or at least reduces the number of expected R events.

|  | Route P (100 miles) | Route Q (200 miles) |
| --- | --- | --- |
| Driver M | 18.9 | 44.7 |
| Driver N | 15.4 | 36.6 |

To determine whether Driver M should be assigned to Route P or Route Q, the (main) diagonal sum may be computed to arrive at 55.5, where Driver M may be assigned to Route P and Driver N may be assigned to Route Q, and the anti-diagonal sum may be computed to arrive at 60.1, where driver N may be assigned to Route P and Driver M may be assigned to Route Q. Because it may be desirable to incur the fewest number of R events possible, the former diagonal sum and associated assignment may be selected. Note that resulting assignment of this example may have been intuitive from the start since only two possible assignments exist. Driver N may be considered a better driver than Driver M and may be intuitively assigned to the longer, more difficult Route Q. In examples where the number of possible assignments may be substantially greater, an algorithm may need to be applied to find an optimal, or at least improved solution that minimizes or at least reduces the number of expected vehicle events.

Another example may include five drivers A-E and five routes 1-5, where a number of expected vehicle events may be provided in each cell. As previously discussed, the example may utilize only a single event, while in practice, tens or hundreds of types of vehicle events may be of consideration, where one or more of the types of vehicle events may be weighted, as will be subsequently discussed. Certain types of vehicle events may be prioritized as being more important, with more severe consequences, and/or greater liability, for example, and may influence the assignment where the goal may not be to reduce the total number of vehicle events, but to reduce the total number of the most important type(s) of vehicle events. To further simplify the discussion, the computations of the geometric mean and/or harmonic mean will be omitted, but it should be appreciated that these computations would be performed by the algorithm under normal circumstances. The assignment matrix may be given as:

|  | Route 1 | Route 2 | Route 3 | Route 4 | Route 5 |
| --- | --- | --- | --- | --- | --- |
| Driver A | 12 | 15 | 13 | 14 | 15 |
| Driver B | 16 | 18 | 15 | 14 | 16 |
| Driver C | 18 | 16 | 15 | 18 | 20 |
| Driver D | 15 | 20 | 18 | 17 | 19 |
| Driver E | 16 | 15 | 18 | 14 | 15 |

In an embodiment, the Hungarian Method may be applied to determine an assignment between Drivers A-E and Routes 1-5 that minimizes, or at least reduces the number of expected vehicle events; i.e., to solve the assignment matrix in S330. Other algorithms known in the computing arts directed to solving the assignment problem may be equivalently used. One possible solution to this assignment matrix may be given as:

|  | Route 1 | Route 2 | Route 3 | Route 4 | Route 5 |
| --- | --- | --- | --- | --- | --- |
| Driver A |  |  | 13 |  |  |
| Driver B |  |  |  | 14 |  |
| Driver C |  | 16 |  |  |  |
| Driver D | 15 |  |  |  |  |
| Driver E |  |  |  |  | 15 |

From this solution, it may be seen that the intuitive choice for each route may not be the best choice overall. For instance, it can be seen from the initial, unsolved assignment matrix above that Driver A may be the driver producing the fewest number of vehicle events on Route 1 while either Driver A or Driver E may produce the fewest number of vehicle events on Route 2, yet neither of these assignments produces a solution that minimizes the total number of vehicle events across all drivers 164 and all routes.

Upon solving the assignment matrix in S335, the system may assign the drivers 164 to the routes accordingly. In an example, the assignment of drivers to routes may be carried out such that a total expected quantity of vehicle events for the selected route is minimized or at least reduced, and/or such that the total expected quantity of vehicle events for all drivers is minimized or at least reduced. This concept may be extended to selecting the trucks or type of trucks that are best for a given route or routes, with both tractor and trailer considered. For instance, a trailer having a lower height may be preferred in windy areas over a trailer having a higher height, and a truck having an engine of increased power may be preferable for hilly routes versus flat routes.

The multiple attribute matching of tractor and trailer to routes may be performed in substantially the same fashion as for drivers and routes. The resulting assignment data, whether drivers to routes, tractors to trailers, tractors and trailers to routes, and the like, may be embodied in one or more data structures that may be subsequently stored in a database, such as system database 150, or other memory storage device, cloud storage, or the like. Drivers 164 may be subsequently assigned to routes using dispatching software that executes on a server, such as any of servers 132, 140, or other third-party servers. The assignment data structures may be communicated to the dispatching software and may be further processed by the dispatching software as appropriate. In an example, the dispatching software may receive the assignment data generated by the system, isolate each driver's assigned route data, and transmit the isolated assignment data to a mobile device, tablet, laptop, notebook, or other computing device of the driver or to the commercial vehicle in possession of the driver.

The assignments between drivers and routes made by the dispatching software may be informed by the received assignment data. In an embodiment, a user such as a fleet manager may be provided with a rendered graphical user interface on a computing device, mobile device, tablet, and the like, with a representation of the routes to be assigned and a listing of candidate drivers. The routes may be superimposed over a map, for example, with relative indications of the route difficulty, such as through a numerical rating, colors (e.g., red, yellow, green), and the like. Candidate drivers may also be displayed and identified by name and/or employee number in a ranked or unranked list along with one or more relative indications of their respective driver performance based on the recent number of miles between vehicle events, as previously discussed. The indications for each driver may be similarly represented by a numerical rating, "percent match," color, and the like. The graphical user interface may, based on the assignment data generated as a result of solving the assignment matrix, provide a recommended matching of candidate drivers to routes that may be further modified by the user. The graphical user interface may also provide a revised recommendation based on the user's modifications to the assignment. For example, a manual reassignment of one driver to a new route may cause a revised recommendation to be generated based on re-solving the assignment matrix, which may modify the route assignment for one or more of the other drivers of the candidate pool.

Driver performance determined in accordance with the present subject matter may also be subsequently utilized to determine whether a driver should be promoted or receive coaching. In an embodiment, a predetermined threshold may exist across several metrics provided by the system, including lane keeping, In addition to where the dispatching software executes a manual reassignment of at least one driver, the assignment matrix in accordance with the present subject matter may need to be solved repeatedly and quickly based on dynamic factors. For instance, a driver 164 may become sick or otherwise indisposed and unable to work, which may prompt assigning a new driver 164. Similarly, a route may become unavailable because of construction, closures, increased tolls, and the like. Drivers 164 may also depart at differing times or have constraints that require their shifts to end at variable times, which may preclude assignment to longer routes.

Multi-Attribute Optimal Assignment

The event detection and reporting system 200 may assign differing weights to different types of vehicle events for driver scoring purposes. These same weights may be used after computing the previously-discussed resulting products. While previous examples have limited the discussion to a single type of vehicle event, the system in accordance with the present subject matter may evaluate the characteristics of both routes and drivers 164 based on many different types of vehicle events. These vehicle events may be weighted according to importance or in any desired manner. For instance, if each of the weights may collectively total 100%, 30% may be allocated to excessive braking events, 40% to collision mitigation braking, 20% to forward collision warning (FCW), and 10% to lane departures (LDW). Each of these vehicle events may be counted based on data collected by sensors or subsystems communicably coupled to the event detection and reporting system 200, as previously described. The resulting products for each route, driver, and vehicle event type may be formed and adjusted by these weights. Following application of the weighting, the Hungarian method previously described or any other algorithm capable of determining a solution to the assignment problem and/or solving an assignment matrix.

In an example, only two types of vehicle events may be considered for the purpose of discussion. A first vehicle event may be of critical importance and weighed at 90% while another may be less important and weighed at just 10%. This may be a suitable weighting arrangement for collision avoidance braking and lane departure warnings, respectively, since collision avoidance braking may be substantially more suggestive of a probable collision than lane departures, for instance. Following this example, it may be assumed that calculating the geometric (or harmonic) mean previously discussed has resulted in an expected rate of 20 miles between collision avoidance braking events and 2 miles between lane departure warnings for a given driver on a given route. Combining the collision avoidance braking events and lane departure warnings events may be expressed as:

event rate$_1$×weight$_1$+event rate$_2$×weight$_2$=combined weighted event rate 20 miles/event×0.90+2 miles/event×0.10=18.2 expected miles/event Assuming the given route distance may be 320 miles, this distance may be divided by the combined weighted event rate to obtain the value(s) used to populate the assignment matrix. In this example, the value may be about 17.6 (weighted) vehicle events expected for the given driver on the given 320-mile route.

Dynamic Assignment

A driver who has already embarked on his or her assigned route may need to select a detour because the currently-assigned route may be experiencing increased traffic, an unexpected closure, and the like. The weighted sum of products previously described may be used to choose an optimal, or at least to make an improved, "educated" selection based on the existence of multiple alternate routes. A "weighted extra time needed" term may also be included in the calculation, where the increased time may change the overall summed product. In this way, a route may be selected based on a combination of overall safety and efficiency; i.e., less time to execute the route. The "weighted extra time" term does not require any adjustment by taking the square root. For instance, suppose an expected number of events is 20 for Route A and 18 for Route B, with both routes going to the same destination. Route B may require 5 additional minutes of travel time than Route A. If every extra minute is assumed to "cost" 0.6 events, then the total cost for Route B is 18+5*0.6=21 events, so B may be less preferable, even though it is expected to be safer.

Further Refinement of Characterization

Both the characterization of routes and of drivers 164 may be further refined. In an example, speed ranges (e.g., 0-20 MPH, 20-40 MPH, 40-60 MPH, and 60+ MPH) may be used as bins for each of the measures to attain an assignment of finer granularity. Date, time, and familiarity with the route may also be used. Some refinements, such as familiarity with a route, may be capped to a maximum value, such as three times, for example, since it may be assumed that after traversing a route three times, a driver's performance may not further measurably improve. The direction of driving may also be considered, where each direction on a road may be considered a separate route, i.e., A to B versus B to A. Capping unweighted product values to some maximum amount may reflect the notion that a driver may perform satisfactorily or "well enough," on a given route, though he or she may not be the best possible choice. As mentioned earlier, using the square root of the road-driver product (i.e., the harmonic mean) may have a similar dampening effect.

Construction of Routes from Characterized and Uncharacterized Sections

Routes may vary and the constituent route sections may also vary. Some of the route sections may be characterized based on vehicle events and some may not. For the uncharacterized routes and route sections, it may be assumed that they possess characteristics of similar routes and assigned default vehicle event values. For example, an uncharacterized route section may be known to have a 40 MPH speed limit, and so may be assigned predicted default vehicle event values based on other route sections having a 40 MPH speed limit. This may occur in previously described S320. The length of route sections that form an overall route may be accounted for forming a weighted, summed product for each route section and then weighting by the percentage of the overall route that each route section accounts for. Stated another way, a doubly-weighted sum may be formed: first, for each route section and its characteristics and those of the driver, producing a weighted, summed product for each route section, and second, for the totality of the route sections that form the route, accounting for the percentage length of each. It may be equivalent to produce a percentage-weighted route characterization only first (if, e.g., there are on average, 80 miles between excessive braking events on the overall route) and subsequently multiply by the driver characteristics. If the square root is used, it may be applied to the unweighted road-driver products, after which weighting and summation may occur.

Mix of Actually Measured and Expected Event Rates

As previously discussed, the vehicle events that occur for each fleet driver 164 while traversing a route or route section may be used to characterize the route according to the mean or average number of vehicle events. Once a driver that has traversed a route section a minimum threshold number of times, an average, expected performance (in terms of vehicle events) may be determined for future traversals of the same route section. A driver may cause vehicle events at frequencies that may exhibit some variation, but the average values may remain generally stable after a minimum threshold number of times may be reached. When a minimum threshold number of traversals may be reached, the system may calculate the average vehicle event frequency and use this average in forming the characterization of the route by averaging the vehicle event totals across multiple drivers. For drivers 164 with a low variation in vehicle event frequency, the minimum threshold number of traversals may be less before the driver's average number of vehicle events become eligible to be used to characterize the route. For drivers 164 with a high variation in vehicle event frequencies, the minimum threshold number of traversals may be greater. The characterization of the route, using route vehicle event total calculations may be computed using the real vehicle event data provided by the traversing drivers, when available, and using expected route section vehicle event data when unavailable.

Compensating for Driver Performance

Driver skill may be evaluated based on their vehicle event frequencies, as previously discussed. The vehicle event detection and reporting system 200 may use the vehicle event frequency data as a basis to modify the operation of the vehicle 112. For instance, if a driver may be known to perform poorly at lane keeping with a high SDLP, the event detection and reporting system 200 of the vehicle or onboard vehicle processor 230 may attempt to improve the driver's performance by providing warnings and indications for lane departures or in-lane wandering sooner than for other drivers 164. For instance, where a warning may normally be provided when a driver crosses over a lane marker without signaling (turn signal), the warning may be provided when the driver may be within a threshold minimum distance from crossing over a lane marker without signaling. Similarly, where a driver may be characterized as exhibiting poor longitudinal control, as determined from a higher frequency of collision mitigation braking events, the onboard vehicle processor 230 may limit the vehicle speed on routes where these types of braking events may be more common due to intersections, merge lanes. Similarly, when a driver exhibits poor longitudinal control, the processor 230 may provide additional or increasingly early indications and warnings about following vehicles too closely.

The previously described route vehicle event data, which may include average frequencies of vehicle events that may characterize the difficulty of a given route, may be conveyed to a driver as he or she begins traversing a route. For instance, where a route may be characterized as difficult, the driver may be alerted to this fact with a descriptive message and prompted to be cautious.

The present subject matter provides an improved technique for characterizing the performance of commercial vehicle drivers and characterizing a route using vehicle event data generated by onboard computing systems disposed within the vehicles. The onboard vehicle computing systems are specialized devices that may be interfaced with various vehicle sensors, systems, subsystems, and communication infrastructure also disposed within the vehicle and connected via communication links, such as a CANbus, to provide vehicle event reporting, safety-related functionalities, trip logging, and the like. The resulting characterizations of drivers and routes, respectively, may be used in a number of ways, including to rank the performance of the drivers, to inform route selections for the transportation of freight, and to assign fleet drivers to routes either in an automated, computer-controlled manner or with the assistance of a human user. The assignment may consider the characteristics of the routes and the characteristics of the drivers using at least one of direct and/or indirect measures. A weighted, summed product of the corresponding route and driver characteristics may be formed that estimates the number of vehicle events that the drivers may be expected to incur on a given route. A driver need not have previously traversed a route in order for the system to assign the driver to that route. Dynamic assignment of a driver to a route while a driver may be en route may be realized using the same weighted, summed product and may further include a weighted time term.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps, or acts are in some way inherently mutually exclusive.

Reference throughout this document to "one embodiment", "certain embodiments", "an embodiment" or similar term means that a feature, structure, or characteristic described in connection with the embodiment is included in at least one embodiment of the present subject matter. Thus, the appearances of such phrases or in various places throughout this specification are not necessarily all referring to the same embodiment. Furthermore, the features, structures, or characteristics may be combined in any suitable manner without limitation.

In accordance with the practices of persons skilled in the art of computer programming, the present subject matter is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, any physical medium with patterns of holes, a RAM, PROM, and EPROM, a FLASH-EPROM, any other memory chip or cartridge, or any other tangible non-transitory medium from which a computer can read.

In addition, and further in accordance with the descriptions herein, the term "logic," as used herein, with respect to FIG. 2A, includes hardware, firmware, software in execution on a machine, and/or combinations of each to perform a function(s) or an action(s), and/or to cause a function or action from another logic, method, and/or system. Logic may include a software-controlled microprocessor, a discrete logic (e.g., ASIC), an analog circuit, a digital circuit, a programmed logic device, a memory device containing instructions, and so on. Logic may include one or more gates, combinations of gates, or other circuit components.

Figure 4:
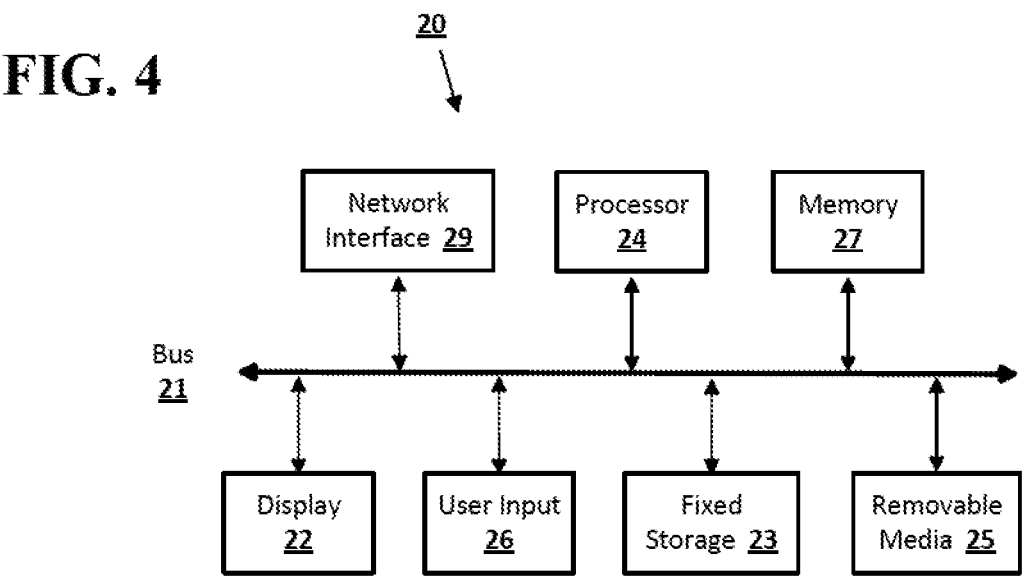
FIG. 4 is an example computing device 20 suitable for implementing embodiments of the presently disclosed subject matter.

Embodiments of the presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of characterizing the performance of a plurality of drivers and a plurality of routes, comprising:

identifying the plurality of routes;
receiving a plurality of vehicle events collected or generated by an onboard computing system of a plurality of vehicles operated by the plurality of drivers via a network;
characterizing a difficulty of each of the plurality of routes based on the plurality of vehicle events;
characterizing a performance of the plurality of drivers based on a subset or all of the plurality of vehicle events collected or received;
assigning at least one driver of the plurality of drivers to a selected route of the plurality of routes based on the characterized performance of the at least one driver and the difficulty of the plurality of routes; and
modifying operation of a vehicle operated by the at least one assigned driver based on the characterized performance of the at least one driver, wherein
the vehicle is a first vehicle equipped with a sensor and previously operated by a first driver of the plurality of drivers, and
the characterizing the performance of the plurality of drivers further comprises:
substituting first vehicle event data of a first driver of the plurality of drivers for second vehicle event data of a second driver operating a second vehicle not equipped with the sensor.

2. The method of claim 1, wherein
the assigning of the at least one driver to the selected route based on the difficulty of the plurality of routes is hierarchically based:
preferentially on vehicle event data for the at least one driver on the selected route, and
less preferentially on vehicle event data for other drivers and/or vehicle event data for other routes.

3. The method of claim 1, further comprising:
assigning the at least one driver to the selected route of the plurality of routes based on the characterized performance of the at least one driver, wherein
the at least one driver is assigned to the selected route such that:
an expected quantity of vehicle events for the selected route is less for the at least one driver than an expected quantity of vehicle events for the selected route for a second driver of the plurality of drivers; or
an expected quantity of vehicle events for all of the plurality of drivers is less than an expected quantity of vehicle events for all of the plurality of drivers when the second driver of the plurality of drivers is assigned to the selected route.

4. The method of claim 1, wherein
the plurality of vehicle events collected or generated by the onboard computing system are based on data at least one of systems, sensors, or components of the vehicle.

5. The method of claim 1, wherein
the characterized difficulty of a route is based on a plurality of route sections each having a route section characterized difficulty and route section length.

6. The method of claim 1, wherein
the plurality of vehicle events are generated by the onboard computing system of the plurality of vehicles in response to lateral and/or longitudinal controlling of the plurality of vehicles.

7. The method of claim 1, further comprising:
determining a plurality of expected quantities of vehicle events to be collected or generated by the vehicles of the plurality of drivers when traversing each of the plurality of routes based on at least one of the characterized difficulties of the plurality of routes, the characterized performance of the plurality of drivers, or a length of the plurality of routes; and
assigning the at least one driver to the selected route of the plurality of routes based on the determined plurality of expected quantities of vehicle events.

8. The method of claim 1, wherein
the plurality of vehicle events in which the characterized difficulty of each of the plurality of routes is based is selected from a first plurality of vehicle events generated by the vehicles of the plurality of drivers and selected from a second plurality of vehicle events generated by the plurality of vehicles not including the vehicle of the at least one driver.

9. The method of claim 1, further comprising:
updating at least one of the characterized route difficulties or the characterized driver performance in real-time based on receiving additional vehicle events.

10. The method of claim 7, further comprising:
assigning the at least one driver to the selected route of the plurality of routes based on the at least one driver's expected quantity of lane departures on the selected route.

11. A method of characterizing the performance of a plurality of drivers and a plurality of routes, comprising:
identifying the plurality of routes;
receiving a plurality of vehicle events collected or generated by an onboard computing system of a plurality of vehicles operated by the plurality of drivers via a network;
characterizing a difficulty of each of the plurality of routes based on the plurality of vehicle events;
characterizing a performance of the plurality of drivers based on a subset or all of the plurality of vehicle events collected or receive;
assigning at least one driver of the plurality of drivers to a selected route of the plurality of routes based on the characterized performance of the at least one driver and the difficulty of the plurality of routes; and
modifying operation of a vehicle operated by the at least one assigned driver based on the characterized performance of the at least one driver, wherein
the characterized difficulty of one route of the plurality of routes is based on the plurality of vehicle events received from only vehicles that have traversed the one route at least a predetermined minimum number of times that varies by driver, wherein
a first predetermined minimum number of times for a first driver of the plurality of drivers having a first variation in vehicle event frequency is less than a second predetermined minimum number of times for a second driver of the plurality of drivers having a second, higher variation in vehicle event frequency.

12. A system for characterizing the performance of a plurality of drivers of a plurality of vehicles and a plurality of routes, comprising:
a processor;
a memory in communication with the processor, the memory storing a plurality of instructions executable by the processor to cause the system to:
identify the plurality of routes;
receive a plurality of vehicle events collected or generated by an onboard computing system of a plurality of vehicles operated by the plurality of drivers via a network;

characterize a difficulty of each of the plurality of routes based on the plurality of vehicle events;

characterize a performance of the plurality of drivers based on a subset or all of the plurality of vehicle events collected or received;

assign at least one driver of the plurality of drivers to a selected route of the plurality of routes based on the at least one driver's expected quantity of events on the selected route; and modify operation of a vehicle operated by the at least one assigned driver based on the characterized performance of the at least one driver.

13. The system of claim 12, wherein the assignment of the at least one driver to the selected route based on the difficulty of the plurality of routes is hierarchically based:

preferentially on vehicle event data for the at least one driver on the selected route, and less preferentially on vehicle event data for other drivers and/or vehicle event data for other routes.

14. The system of claim 12, wherein the memory further comprises instructions executable by the processor to cause the system to:

assign the at least one driver to the selected route of the plurality of routes based on the characterized performance of the at least one driver, wherein the at least one driver is assigned to the selected route such that:

an expected quantity of vehicle events for the selected route is less for the at least one driver than an expected quantity of vehicle events for the selected route for a second driver of the plurality of drivers; or an expected quantity of vehicle events for all of the plurality of drivers is less than an expected quantity of vehicle events for all of the plurality of drivers when the second driver of the plurality of drivers is assigned to the selected route.

15. The system of claim 12, wherein the plurality of vehicle events collected or generated by the onboard computing system are based on at least one of systems, sensors, or components of the vehicle.

16. The system of claim 12, wherein the vehicle is a first vehicle equipped with a sensor and previously operated by a first driver of the plurality of drivers, and the characterization of the performance of the plurality of drivers further comprises: substituting first vehicle event data of a first driver of the plurality of drivers for second vehicle event data of a second driver operating a second vehicle not equipped with the sensor.

17. The system of claim 12, wherein the characterized difficulty of a route is based a plurality of route sections each having a route section characterized difficulty and route section length.

18. The system of claim 12, wherein the characterized difficulty of one route of the plurality of routes is based on the plurality of vehicle events received from only vehicles that have traversed the one route at least a predetermined minimum number of times that varies by driver, wherein a first predetermined minimum number of times for a first driver of the plurality of drivers having a first variation in vehicle event frequency is less than a second predetermined minimum number of times for a second driver of the plurality of drivers having a second, higher variation in vehicle event frequency.

19. The system of claim 12, wherein the plurality of vehicle events are generated by the onboard computing system of the plurality of vehicles in response to lateral and/or longitudinal controlling of the plurality of vehicles.

20. The system of claim 12, wherein the memory further comprises instructions to cause the system to:

determine a plurality of expected quantities of vehicle events to be collected or generated by the vehicles of the plurality of drivers when traversing each of the plurality of routes based on at least one of the characterized difficulties of the plurality of routes, the characterized performance of the plurality of drivers, or a length of the plurality of routes; and assign the at least one driver to the selected route of the plurality of routes based on the determined plurality of expected quantities of vehicle events.

21. The system of claim 12, wherein the plurality of vehicle events in which the characterized difficulty of each of the plurality of routes is based is selected from a first plurality of vehicle events generated by the vehicles of the plurality of drivers and selected from a second plurality of vehicle events generated by the plurality of vehicles not including the vehicle of the at least one driver.

22. The system of claim 12, wherein the memory further comprises instructions executable by the processor to cause the system to:

update at least one of the characterized route difficulties or the characterized driver performance in real-time based on receiving additional vehicle events.

* * * * *